(12) United States Patent
Kanazawa et al.

(10) Patent No.: US 9,726,182 B2
(45) Date of Patent: Aug. 8, 2017

(54) ELECTRIC WATER PUMP MOTOR CASING

(71) Applicants: Hirofumi Kanazawa, Toyota (JP); Takeshi Yamamoto, Ama (JP)

(72) Inventors: Hirofumi Kanazawa, Toyota (JP); Takeshi Yamamoto, Ama (JP)

(73) Assignees: TOYOTA JIDOSHA KABUSHIKI KAISHA, Toyota-shi (JP); DENSO CORPORATION, Kariya-Shi (JP)

( * ) Notice: Subject to any disclaimer, the term of this patent is extended or adjusted under 35 U.S.C. 154(b) by 292 days.

(21) Appl. No.: 14/356,470

(22) PCT Filed: Nov. 6, 2012

(86) PCT No.: PCT/IB2012/002244
§ 371 (c)(1),
(2) Date: May 6, 2014

(87) PCT Pub. No.: WO2013/068806
PCT Pub. Date: May 16, 2013

(65) Prior Publication Data
US 2014/0294631 A1    Oct. 2, 2014

(30) Foreign Application Priority Data

Nov. 7, 2011 (JP) ................................. 2011-243488

(51) Int. Cl.
*F04D 13/06* (2006.01)
*H02K 5/12* (2006.01)
(Continued)

(52) U.S. Cl.
CPC ........... *F04D 13/06* (2013.01); *F04D 29/126* (2013.01); *F04D 29/426* (2013.01); *H02K 5/10* (2013.01); *H02K 5/12* (2013.01); *F05B 2260/603* (2013.01)

(58) Field of Classification Search
CPC .. H02K 5/00; H02K 5/04; H02K 5/12; H02K 5/136; H02K 9/00; H02K 9/02;
(Continued)

(56) References Cited

U.S. PATENT DOCUMENTS 2,470,563 A * 5/1949 Jennings ............... F02M 37/103
310/87
2,994,795 A * 8/1961 Cattabiani ............. H02K 5/128
310/59

(Continued)

FOREIGN PATENT DOCUMENTS

| CN | 200968292 Y | 10/2007 |
|---|---|---|
| EP | 0899462 A1 | 3/1999 |

(Continued)

*Primary Examiner* — William H Rodriguez
*Assistant Examiner* — Joseph Herrmann
(74) *Attorney, Agent, or Firm* — Andrews Kurth Kenyon LLP

(57) ABSTRACT

A water pump has a pump section having radial impeller blades, a rotational shaft for rotating the radial impeller blades, and a motor section provided in the rear of the pump section and driving the rotational shaft. The motor section has a motor casing, a motor housed in the motor casing and rotating the rotational shaft, bearings provided on both sides of the motor interposed between them on the rotational shaft, interposed between an inner surface of the motor casing and the rotational shaft, and rotatably supporting the rotational shaft. In the motor casing, a vent hole for venting air between a motor space in which the motor is disposed in the motor casing and an outside of the motor casing is formed.

18 Claims, 4 Drawing Sheets

(51) Int. Cl.
*H02K 5/10* (2006.01)
*F04D 29/42* (2006.01)
*F04D 29/12* (2006.01)

(58) Field of Classification Search
CPC .. H02K 9/04; H02K 9/06; H02K 5/10; H02K 5/132; H02K 5/124; F04D 13/06; F04D 25/06; F04D 25/062; F04D 29/046; F04D 29/056; F04D 29/08; F04D 29/086; F04D 29/10; F04D 29/106; F04D 29/40; F04D 29/406; F04D 29/426; F04D 29/58; F04D 29/5813; F04D 29/5806; F04D 29/586; F04D 29/588; F04D 1/00; F04D 13/0693; F04B 53/06
USPC .......................................................... 310/88
See application file for complete search history.

(56) References Cited

U.S. PATENT DOCUMENTS

| | | | | |
|---|---|---|---|---|
| 3,228,341 | A * | 1/1966 | Hungerford, Jr. | F04D 13/0613 310/90 |
| 3,229,130 | A * | 1/1966 | Drouard | C08B 11/04 310/54 |
| 3,406,710 | A * | 10/1968 | Voda | D06F 9/022 137/565.11 |
| 3,914,072 | A * | 10/1975 | Rowley | F04D 29/126 277/371 |
| 4,336,473 | A * | 6/1982 | Wetters | H02K 5/10 310/57 |
| 4,978,875 | A * | 12/1990 | Okamoto | F02N 15/00 310/43 |
| 5,125,795 | A * | 6/1992 | Suzuki | F04D 29/126 415/168.2 |
| 5,156,535 | A * | 10/1992 | Budris | F04D 13/06 277/405 |
| 5,647,736 | A * | 7/1997 | French | H02K 5/20 417/423.14 |
| 5,795,137 | A * | 8/1998 | Ozawa | F04D 29/708 417/362 |
| 6,082,974 | A * | 7/2000 | Takemoto | F04D 15/0066 417/366 |
| 6,183,208 | B1 * | 2/2001 | Qandil | F04D 13/08 310/54 |

FOREIGN PATENT DOCUMENTS

| | | |
|---|---|---|
| JP | 61-200492 U1 | 12/1986 |
| JP | 05-074162 U1 | 10/1993 |
| JP | 06-077466 U1 | 10/1994 |
| JP | 10-024192 | 1/1998 |
| JP | 2000-134858 A | 5/2000 |
| JP | 2000-274399 A | 10/2000 |
| JP | 2004-052565 A | 2/2004 |
| JP | 2004-162609 A | 6/2004 |
| JP | 2005-299602 A | 10/2005 |
| JP | 2006-327300 A | 12/2006 |
| JP | 2008-240543 A | 10/2008 |

* cited by examiner

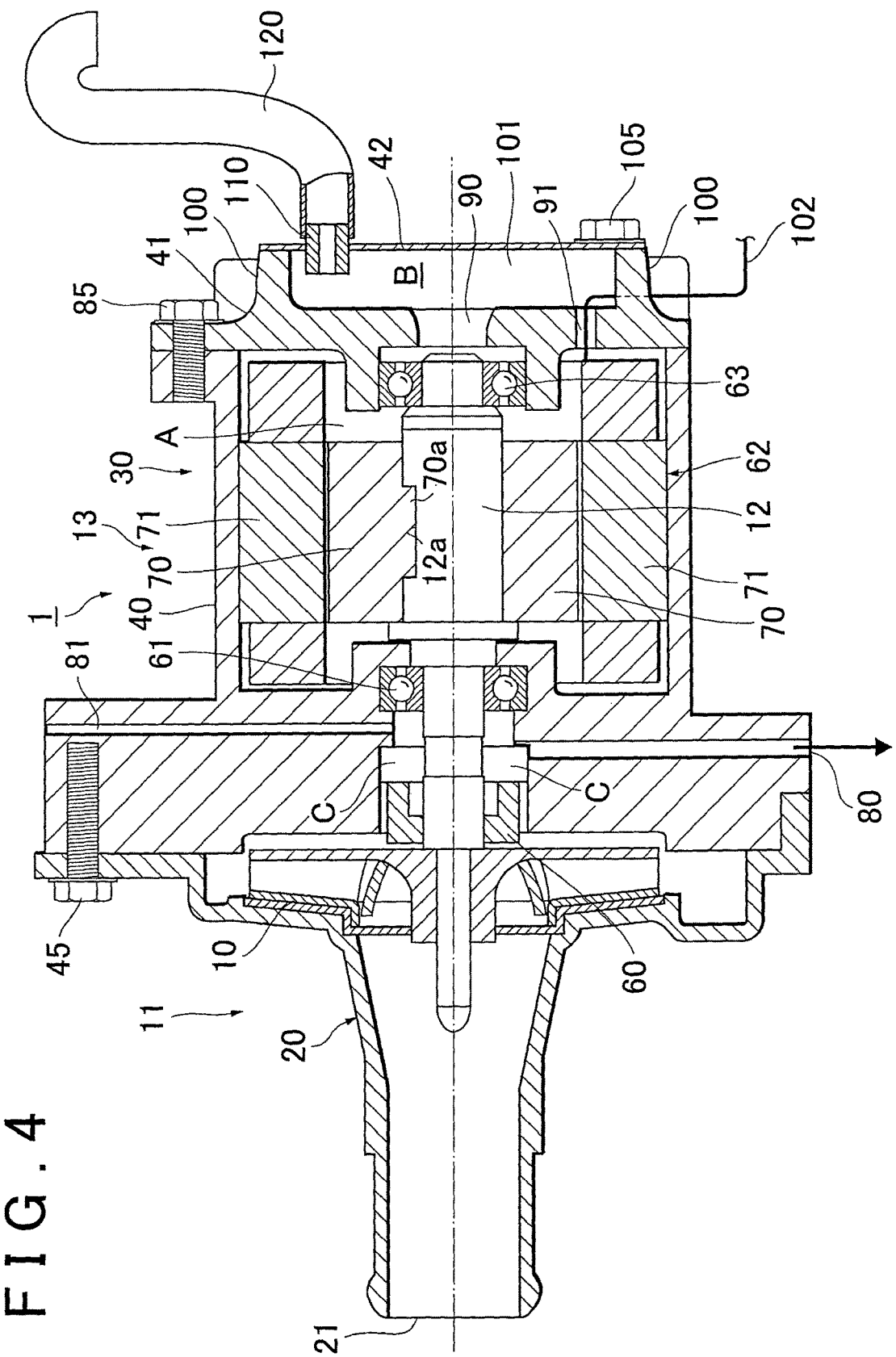

ELECTRIC WATER PUMP MOTOR CASING

CROSS-REFERENCE TO RELATED APPLICATIONS

This is a national phase application based on the PCT International Patent Application No. PCT/IB2012/002244 filed Nov. 6, 2012, claiming priority to Japanese application No. 2011-243488 filed Nov. 7, 2011, the entire contents of both of which are incorporated herein by reference.

BACKGROUND OF THE INVENTION

1. Field of the Invention

The present invention relates to a water pump.

2. Description of the Related Art

For example, a water pump for supplying cooling water to a fuel cell is installed in a fuel cell automobile or the like.

The water pump generally includes a pump section having radial impeller blades and a motor section for driving a rotational shaft for rotating the radial impeller blades (see Japanese Patent Application Publication No. 10-24192 (JP 10-24192 A)). The motor section is covered by a motor casing and has a motor for rotating the rotational shaft, bearings provided in front and rear of the motor, and so forth.

In the water pump, water supplied to the pump section may leak to the motor section side along a sealing section. Therefore, a measure is suggested such that a weep hole is provided on the motor section side of the pump section (see Japanese Patent Application Publication No. 2004-162609 (JP 2004-162609 A)).

However, even if the weep hole described above is provided, water leaking from the pump section may deposit, for example, in a vicinity of the bearing on the front side on the motor section side. As a result, when air expansion or compression occurs due to temperature fluctuation or the like caused by heat in the motor casing and the air in the motor casing is rapidly compressed, the water deposited in the vicinity of the bearing may enter the motor of the motor section from the bearing. If water enters the motor, failure of the water pump may occur.

SUMMARY OF THE INVENTION

An object of the present invention is to prevent water leaking from a pump section in a water pump from entering a motor.

An aspect of the present invention relates to a water pump having: a pump section having impeller blades; a rotational shaft that rotates the impeller blades; and a motor section that drives the rotational shaft. The motor section has: a motor casing; a motor housed in the motor casing and rotating the rotational shaft; and bearings provided on both sides of the motor interposed therebetween on the rotational shaft, interposed between an inner surface of the motor casing and the rotational shaft, and rotatably supporting the rotational shaft. In the motor casing, a motor space that houses the motor in the motor casing, and a vent hole that vents air between the motor space and an outside of the motor casing are formed.

According to the present invention, when air in the motor space in the motor casing rapidly compresses, outside air flows in through the vent hole and the air compression inside the motor is returned to an uncompressed state. Therefore, water leaking from the pump section can be prevented from entering the motor space through the bearings.

In the water pump, a rear space communicating with the motor space may formed in the rear of the rear bearing in the motor casing, and the vent hole may open at the rear space.

A waterproof sealing and a weep hole may be provided between the impeller blades of the pump section and the front bearing of the motor section on the rotational shaft.

The vent hole is provided in an upper surface of the motor casing.

The water pump may further include a cover that covers an outside opening of the vent hole.

A hose may be connected to the vent hole.

A tip of the hose may be bent downward.

According to the present invention, water leaking from a pump section in a water pump can be prevented from entering a motor, and reliability of the water pump can thus be improved.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 4 is an explanatory view of a vertical cross section of the water pump in a case that a hose is connected to the vent hole.

DETAILED DESCRIPTION OF EMBODIMENTS

Figure 1:
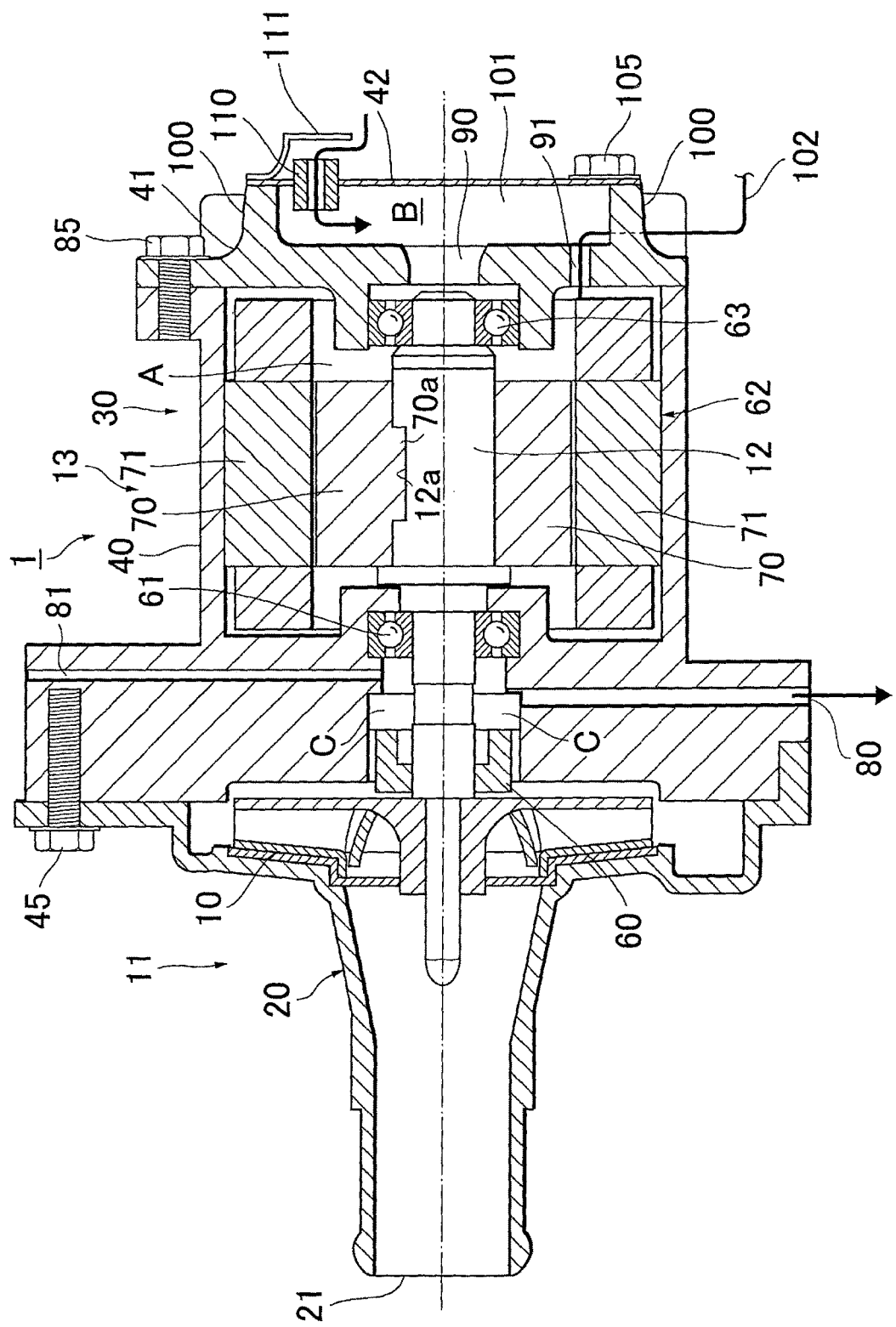
FIG. 1 is an explanatory view of a vertical cross section illustrating a configuration of a water pump.

FIG. 1 is an explanatory view illustrating a general configuration of a water pump 1 in accordance with an embodiment of the present invention.

The water pump 1 has a pump section 11 having radial impeller blades 10, a rotational shaft 12 for rotating the radial impeller blades 10, and a motor section 13 for driving the rotational shaft 12. The pump section 11 and the motor section 13 are aligned along the rotational shaft 12. The pump section 11 is in front of the rotational shaft 12. The motor section 13 is in the rear of the rotational shaft 12.

The pump section 11 has a pump casing 20 whose diameter is small in its front portion (on the left side in FIG. 1) along the axial direction and gradually becomes large towards its rear portion. The plurality (for example, six, seven, or eight) of radial impeller blades 10 are provided in the large diameter portion in the rear portion of the pump casing 20. The radial impeller blades 10 are fixed to a vicinity of a front end of the rotational shaft 12. The small diameter portion in the front portion of the pump casing 20 serves as an inlet port 21, and an outlet port which is not shown is formed on a side of the large diameter portion in the rear portion of the pump casing 20. The inlet port 21 and the outlet port of the pump casing 20 are unitarily molded, for example. Further, an air vent port which is not shown is unitarily formed in the pump casing 20. The pump section 11 generates differential pressure by rotation of the radial impeller blades 10 via the rotational shaft 12 and can thereby allow water entering from the inlet port 21 to flow out through the outlet port.

The motor section 13 has a motor casing 30, for example. The motor casing 30 has a generally cylindrical first casing section 40 provided, for example, for covering the rotational shaft 12 around its axis, a second casing 41 for covering a rear opening of the first casing section 40 in the rear of the rotational shaft 12, and a third casing section 42 provided in the rear of the second casing section 41 for forming a rear space B between itself and the second casing section 41.

The first casing section 40 is formed of an aluminum casting, for example, and is fastened to the pump casing 20 with a bolt 45. The rotational shaft 12 is placed at the center in the first casing section 40. In the first casing section 40, from the front side toward the rear side along the rotational shaft 12, a mechanical sealing 60 as a water proof sealing for preventing water leakage, a front bearing 61, a motor 62, a rear bearing 63 are provided in this order.

The mechanical sealing 60 is air-tightly provided between an inner peripheral surface of the first casing section 40 and the rotational shaft 12. The front bearing 61 and the rear bearing 63 are single-line rolling bearings, for example, and rotatably support the rotational shaft 12. The front bearing 61 is interposed between the inner peripheral surface of the first casing section 40 and the rotational shaft 12. The rear bearing 63 is interposed between an inner peripheral surface of the second casing section 41 and the rotational shaft 12.

The motor 62 is disposed in a motor space A formed inside the first casing section 40. The motor 62 is fixed to the rotational shaft 12, for example, and has a rotor 70 annularly disposed on the rotational shaft 12 around its axis and a stator 71 fixed to the inner peripheral surface of the first casing section 40. The motor 62 is inserted to a cupper plate, for example, and is thereby positioned. Further, a key groove 12a is formed in the rotational shaft 12 formed of stainless steel. A protrusion 70a is formed on the rotor 70. The protrusion 70a of the rotor 70 is fitted in the key groove 12a of the rotational shaft 12, thereby fixing the motor 62 to the rotational shaft 12. The stator 71 is fitted in the aluminum casting. The fitting between the rotational shaft 12 and the rotor 70 may be made by use of press fitting, fastening with a bolt, or the like instead of the use of key groove. The stator 71 is supplied with electric power and thereby rotates the rotor 70. Accordingly, the rotational shaft 12 can be rotated.

A water removal space C is formed between the mechanical sealing 60 inside the first casing section 40 and the front bearing 61. A weep hole 80 and a steam removal hole 81 that communicate with the outside of the first casing section 40 from the water removal space C are formed in the first casing section 40. The weep hole 80 is provided in, for example, a lower portion of the first casing section 40. The steam removal hole 81 is provided in an upper portion of the first casing section 40.

The second casing section 41 is formed of an aluminum casting, for example, and is in a general disc shape. The second casing section 41 is fastened to the first casing section 40 with a bolt 85. A center hole 90, for example, is formed in a central portion of the second casing section 41. Through the center hole 90, the rotational shaft 12 on the first casing section 40 side and the rear bearing 63 and the rear space B on the third casing section 42 side communicate with each other. Further, in the second casing section 41, a communication hole 91 is formed through which the motor space A of the first casing section 40 and the rear space B communicate with each other.

On a rear surface of the second casing section 41, an annular protrusion 100 which protrudes rearward is formed, and an inside of the annular protrusion 100 is provided as a recess 101. A wire 102 connected between a power source and the stator 71, for example, enters the second casing section 41 from its outside, air-tightly passes along a side of the protrusion 100, then through the communication hole 91, for example, and is connected to the stator 71.

The third casing section 42 is formed into a plate shape by punching, for example. The third casing section 42 is fastened to the second casing section 41 with a bolt 105. The third casing section 42 is mounted on an end of the protrusion 100 of the second casing section 41 such that it covers the recess 101. Accordingly, the rear space B is formed.

In the third casing section 42, a vent hole 110 for venting air from the rear space B to the outside is formed. The vent hole 110 is formed above the center of the third casing section 42, for example. The vent hole 110 allows communication between the motor space A and the outside through the rear space B and the center hole 90 or through the rear space B and the communication hole 91. Further, in the third casing section 42, a cover 111 for covering an outside opening of the vent hole 110 is provided. The cover 111 is mounted on an upper portion of the vent hole 110 of the third casing section 42, for example, and is formed into a plate shape which extends rearwardly downward from the third casing section 42 and thereafter extending downward.

Next, the function of the water pump 1 configured as described above will be described. When the water pump 1 is operated, the motor 62 is driven, the motor 62 rotates the rotational shaft 12, and the radial impeller blades 10 of the pump section 11 are thereby rotated. Accordingly, water flows in through the inlet port 21 of the pump section 11, then obtains pressure, and is discharged from the outlet port.

In such a process, the mechanical sealing 60 prevents the water in the pump section 11 from entering the motor 62 side. In a case that, in spite of the prevention, the water in the pump section 11 passes through the mechanical sealing 60, the water is discharged from the weep hole 80.

Further, in a case that air in the motor space A expands due to the influence of heat or the like generated during driving of the motor 62 and the air thereafter rapidly compresses, outside air enters through the vent hole 110 and thereby the air, which has been expanded or compressed, is returned to an unexpanded and uncompressed state. Accordingly, even if water deposits on the water removal space C between the mechanical sealing 60 and the front bearing 61, the weep hole 80, or the front bearing 61, such water is prevented from entering the motor space A.

According to this embodiment, the vent hole 110 prevents the water in the pump section 11 from entering the motor space A, thus improving reliability of the water pump 1.

Further, in this embodiment, the rear space B communicating with the motor space A is formed in the rear of the rear bearing 63 in the motor casing 30, and the vent hole 110 opens at the rear space B. Therefore, the vent hole 110 does not open directly to the motor space A. Even if outside water enters through the vent hole 110, the water is prevented from entering the motor space A.

The mechanical sealing 60 and the weep hole 80 are provided between the radial impeller blades 10 of the pump section 11 on the rotational shaft 12 and the front bearing 61 of the motor section 13. Therefore, the mechanical sealing 60 prevents the water leaking from the pump section 11 from reaching the water removal space C. Even if the water reaches the water removal space C, the water can be discharged through the weep hole 80. Accordingly, leaking water can be effectively prevented from entering the motor space A. Further, in a case that leaking water once reaches the space C, water droplets are apt to deposit on the front bearing 61. However, since the vent hole 110 prevents the water droplets from being drawn into the motor space A as described above, the water can be effectively and certainly prevented from entering the motor 62 in the water pump as a whole.

The water pump 1 has the cover 111 for covering the outside opening of the vent hole 110. Therefore, hypothetically, if water deposits on an outer surface of the motor casing 30, the water is prevented from entering through the vent hole 110.

Figure 2:
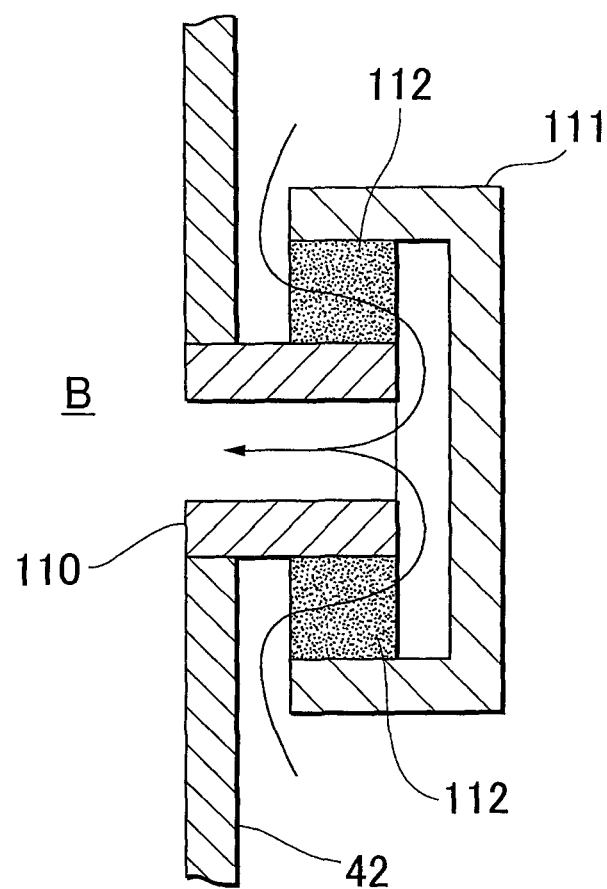
FIG. 2 is an explanatory view illustrating other shapes of a vent hole and a cover.

For example, as shown in FIG. 2, the cover 111 may be formed into a cap shape which covers the vent hole 110 in a manner capable of venting air. In such a case, a member 112 which is waterproof and air-permeable such as foamable resin may be placed in a venting portion between the vent hole 110 and the cover 111.

Figure 3:
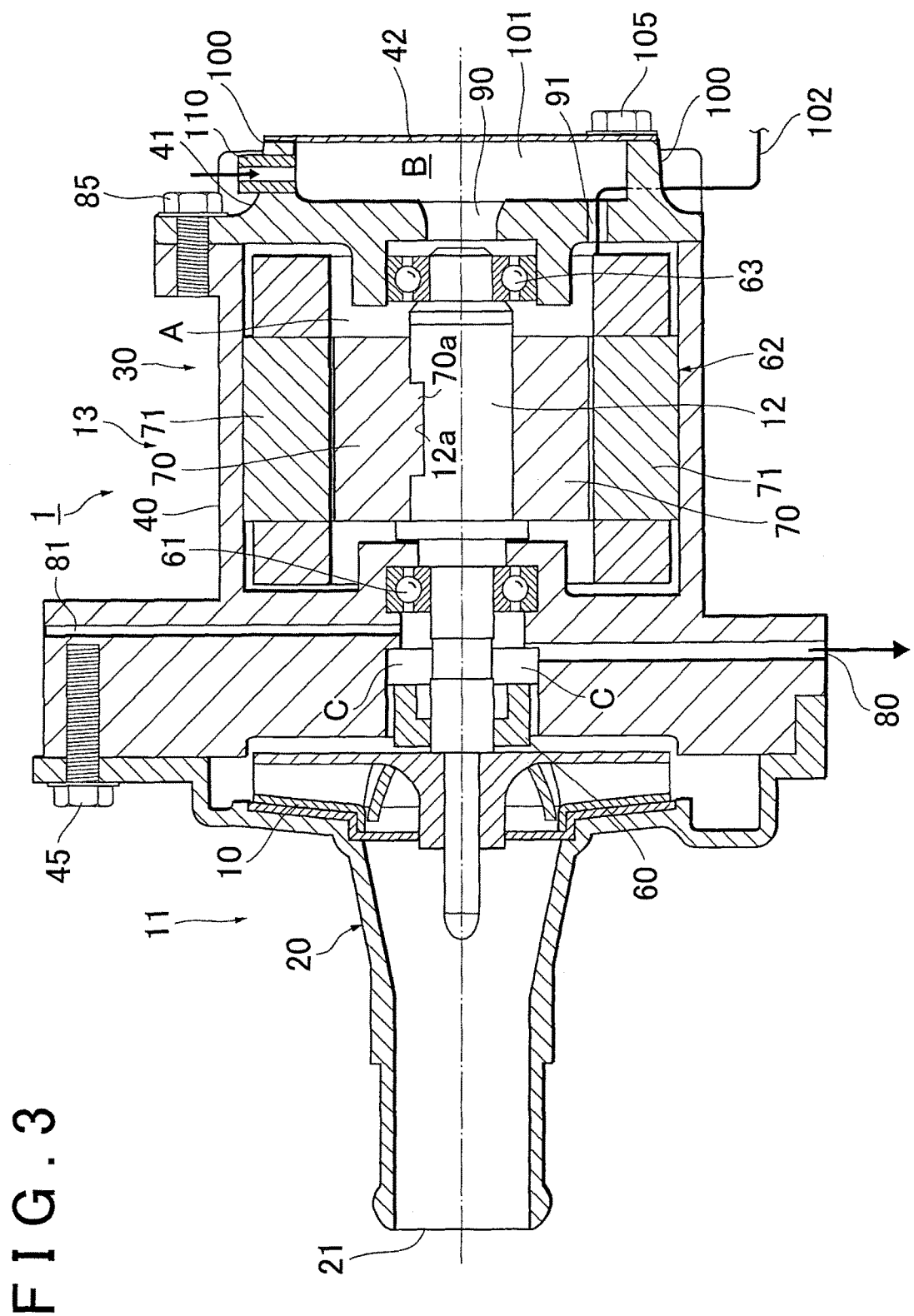
FIG. 3 is an explanatory view of a vertical cross section of the water pump in a case that a vent hole is formed in an upper surface of a motor casing.

In the embodiment described above, the vent hole 110 is formed in the third casing section 42 on a back side of the motor casing 30. However, as shown in FIG. 3, the vent hole 110 may be provided in an upper surface of the motor casing 30. In such a case, a high position of the vent hole 110 makes it difficult for outside water to enter the vent hole 110.

Further, as shown in FIG. 4, a hose 120 may be connected to the vent hole 110. Accordingly, since a tip of the hose 120 can be placed in a higher position, outside water can be prevented from entering the vent hole 110. Further, the tip of the hose 120 can be bent downward. In such a case, entrance of water can be more certainly prevented.

As described in the foregoing, a preferable embodiment of the present invention has been described with reference to the attached drawings. However, the present invention is not limited to such an example. It is apparent to those skilled in the art that various variations or modifications can be arrived at within scope of the spirit recited in the claims, and it is understood that those of course belong to the technical scope of the present invention.

For example, in the embodiment described above, the pump casing 20 or the motor casing 30 may have another shape. Further, the vent hole 110 may be formed in another position in the motor casing 30. The water pump in accordance with the present invention can be applied to vehicles such as fuel cell automobiles, electric automobiles, and hybrid automobiles and various moving bodies (such as watercrafts, airplanes, and robots).

The present invention is useful for preventing water leaking from a pump section in a water pump from entering a motor.

What is claimed is:

1. A water pump comprising:
a pump section having impeller blades;
a rotational shaft that rotates the impeller blades; and
a motor section including:
an electric motor that rotates the rotational shaft;
a motor casing that houses the electric motor and includes a casing section having a cylindrical shape;
a mechanical sealing that provides an air-tight sealing between an inner peripheral surface of the casing section and the rotational shaft;
first and second bearings provided on both sides of the electric motor interposed therebetween on the rotational shaft, interposed between an inner surface of the motor casing and the rotational shaft, and rotatably supporting the rotational shaft;
a water removal space between the mechanical sealing and one of the first bearing and the second bearing;
a weep hole that communicates between the water removal space and an outside of the casing section;
a steam removal hole that communicates between the water removal space and the outside of the casing section;
a first space that houses the electric motor;
a first partition wall that divides the first space from a second space, said first and second spaces within the motor casing;
a communication hole through the first partition wall to communicate between the first space and the second space; and
a vent hole that vents air between the first space and an outside of the motor casing via the second space, wherein the vent hole is provided only at an upper position of the motor casing.

2. The water pump according to claim 1, wherein the second bearing is provided between the first space and the second space, and the vent hole opens at the second space.

3. The water pump according to claim 2, wherein
the motor casing has a second partition wall that separates the second space from the outside of the motor casing, and
the second partition wall has the vent hole.

4. The water pump according to claim 1, wherein the vent hole is provided in an upper surface of the motor casing.

5. The water pump according to claim 1, further comprising a cover that covers an opening of the vent hole.

6. The water pump according to claim 1, wherein a hose is connected to the vent hole.

7. The water pump according to claim 6, wherein a tip of the hose is bent downward.

8. The water pump according to claim 1, wherein the pump section includes a third space communicating with the first space via the first bearing.

9. The water pump according to claim 1, wherein the pump section is connected to the motor casing.

10. A water pump comprising:
a pump section having impeller blades;
a rotational shaft that rotates the impeller blades;
a motor section including:
an electric motor that rotates the rotational shaft;
a motor casing that houses the electric motor and includes a casing section having a cylindrical shape;
a mechanical sealing that provides an air-tight sealing between an inner peripheral surface of the casing section and the rotational shaft;
first and second bearings provided on both sides of the electric motor interposed therebetween on the rotational shaft, interposed between an inner surface of the motor casing and the rotational shaft, and rotatably supporting the rotational shaft;
a water removal space between the mechanical sealing and one of the first bearing and the second bearing;
a weep hole that communicates between the water removal space and an outside of the casing section;
a steam removal hole that communicates between the water removal space and the outside of the casing section;
a first space that houses the electric motor;
a first partition wall that divides the first space from a second space, said first and second spaces within the motor casing;
a communication hole through the first partition wall to communicate between the first space and the second space; and
a vent hole that vents air between the first space and an outside of the motor casing via the second space; and
a member that covers an opening of the vent hole.

11. The water pump according to claim 10, wherein
the second bearing is provided between the electric motor and the second space, and
the vent hole opens at the second space.

12. The water pump according to claim 11, wherein
the motor casing has a second partition wall that separates the second space from the outside of the motor casing, and
the second partition wall has the vent hole.

13. The water pump according to claim 10, wherein the vent hole is provided in an upper surface of the motor casing.

14. The water pump according to claim 10, wherein the member is a cover.

15. The water pump according to claim 10, wherein the member is a hose that is connected to the vent hole.

16. The water pump according to claim 15, wherein a tip of the hose is bent downward.

17. The water pump according to claim 10, wherein the pump section includes a third space communicating with the first space via the first bearing.

18. The water pump according to claim 10, wherein the pump section is connected to the motor casing.

* * * * *